US009069433B2

(12) United States Patent
Hunt

(10) Patent No.: US 9,069,433 B2
(45) Date of Patent: Jun. 30, 2015

(54) METHOD AND APPARATUS FOR GENERATING CHAIN-LINK FENCE DESIGN

(76) Inventor: Randall Hunt, Corpus Christi, TX (US)

(*) Notice: Subject to any disclaimer, the term of this patent is extended or adjusted under 35 U.S.C. 154(b) by 639 days.

(21) Appl. No.: 13/370,836

(22) Filed: Feb. 10, 2012

(65) Prior Publication Data
US 2013/0211947 A1 Aug. 15, 2013

(51) Int. Cl.
G06F 3/048 (2013.01)
G06Q 30/06 (2012.01)

(52) U.S. Cl.
CPC ............ *G06F 3/048* (2013.01); *G06Q 30/0621* (2013.01)

(58) Field of Classification Search
CPC .................................................. G06Q 30/0621
USPC ......................................................... 705/36.5
See application file for complete search history.

(56) References Cited

U.S. PATENT DOCUMENTS 7,076,898 B1 7/2006 Hunt ........................... 40/611.01
7,613,362 B1* 11/2009 Schroeder ..................... 382/294
2002/0167535 A1* 11/2002 Matsumoto ................... 345/629
2004/0022453 A1* 2/2004 Kusama et al. ............... 382/284
2004/0217339 A1* 11/2004 Stone ............................. 256/19
2007/0250197 A1* 10/2007 Glass et al. ..................... 700/96
2010/0194780 A1* 8/2010 Acworth ....................... 345/619
2010/0325016 A1* 12/2010 Marcus et al. ................. 705/27
2011/0254852 A1* 10/2011 Howson ........................ 345/582
2012/0139932 A1* 6/2012 Sakamoto ..................... 345/581
2013/0113825 A1* 5/2013 Wine ............................ 345/629

OTHER PUBLICATIONS

Diaz, K.A.., Mosaic Maker, 2004, Hispanic, 17(6), pp. 55.*

* cited by examiner

*Primary Examiner* — Courtney Stopp
*Assistant Examiner* — Brittany Bargeon
(74) *Attorney, Agent, or Firm* — M. Susan Spiering; Ferrell's, PLLC

(57) ABSTRACT

A method and system for generating a schematic illustration of a design made by inserting cups in the openings of a chain-link fence are provided. A customer uploads a design representation through a web based interface. The designer adjusts the representation into a matrix of polygons displayed on a graphical user interface (GUI). The matrix of polygons represents the polygonal openings of the chain-link fence. The representation is converted into a cluster of highlighted polygons that represents the schematic illustration of the design. The customer can customize the design parameters and place an order for the design.

14 Claims, 9 Drawing Sheets

FIG. 9

METHOD AND APPARATUS FOR GENERATING CHAIN-LINK FENCE DESIGN

BACKGROUND

1. Field of the Invention

The present invention relates generally to decorative design creation. More particularly, the present invention relates to a method and system for generating a schematic illustration of a design to be used in chain-link fence decoration.

2. Description of the Related Art

It is a commonplace to see fences such as chain-link fences surrounding properties in the United States and worldwide. These fences, especially the ones owned by businesses, sports clubs, playgrounds, and farms can be strategically utilized to advertise various products and services offered by the owners. An advantage of fence advertising over signage based advertising is that it is cost effective, its placement is more attractive and a large space is readily available in the form of a fence. The chain link fence design also provides privacy to the users.

Put-in Cups™ provides one such commercial chain-link fence décor solution. Put-in Cups™ uses an insert device in the form of a cup, which can be releasably secured to an opening in the chain-link fence. The cup snaps into the fence opening and can be easily detached therefrom. Such types of cups and associated advertising techniques are disclosed in the U.S. Pat. No. 7,076,898, by Randall Hunt, entire contents of which are incorporated herein by reference.

In the existing commercial chain-link fence advertising solutions, an image or text is converted into a décor design manually, i.e. a designer converts the design into the schematic and transforms it into fence décor. Moreover, the number of cups required for the design needs to be estimated manually. This is a time consuming and laborious task. It is therefore desirable to provide a method and system that eliminates this need for manual intervention in the design process, thereby making the décor creation cost effective and convenient.

SUMMARY

An object of the present invention is to provide a method and system for generating a schematic illustration of a design made by inserting decorative cups in a chain link fence.

Another object of the present invention is to provide a method for designing fence décor that eliminates the manual intervention required in the design process and estimation of number of cups.

Yet another object of the present invention is to provide a method for designing a fence décor that is cost effective and convenient.

An embodiment of the present invention provides a computer-implemented method for generating a schematic illustration of a design made by inserting a plurality of devices in generally polygonal openings of a chain-link fence. At least one of an image and a text representation of the design is received at a computer. The user is allowed to adjust the at least one representation into a matrix of polygons displayed on a graphical user interface (GUI) of the computer. The matrix of polygons represents the generally polygonal openings of the chain-link fence. The at least one representation is converted into a cluster of highlighted polygons by highlighting the polygons from the matrix that overlap with the at least one representation, wherein the cluster of highlighted polygons represents the schematic illustration of the design.

Another embodiment of the present invention provides a computer program product for use with a computer, for generating a schematic illustration of a design made by inserting a plurality of devices in generally polygonal openings of a chain-link fence. The computer program product receives at least one of an image and a text representation of the design. The user is allowed to adjust the at least one representation into a matrix of polygons displayed on a graphical user interface (GUI) of the computer. The matrix of polygons represents the generally polygonal openings of the chain-link fence. The at least one representation is converted into a cluster of highlighted polygons by highlighting the polygons from the matrix that overlap with the at least one representation, wherein the cluster of highlighted polygons represents the schematic illustration of the design.

Yet another embodiment of the present invention provides a system for generating a schematic illustration of a design made by inserting a plurality of devices in generally polygonal openings of a chain-link fence. At least one of an image and a text representation of the design are received at the system. The system includes a display unit for displaying a graphical user interface (GUI), a user interactive terminal configured for allowing a user to adjust the at least one representation into a matrix of polygons displayed on the GUI, wherein the matrix of polygons represents the generally polygonal openings of the chain-link fence; and a processor, communicatively coupled to the display unit and the user interactive terminal. The processor is configured for converting the at least one representation into a cluster of highlighted polygons by highlighting the polygons from the matrix that overlap with the at least one representation, wherein the cluster of highlighted polygons represents the schematic illustration of the design. The system further includes a customer terminal in communication with the processor, for allowing a customer to upload at least one of the image and the text representation, select one or more colors associated with the design, view a cost associated with the design, print one or more parameters associated with the design and the cost, and place an order for the design.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

FIG. 9 shows a cup count pop-up window, in accordance with an embodiment of the present invention.

DETAILED DESCRIPTION OF THE EMBODIMENTS

Figure 1:
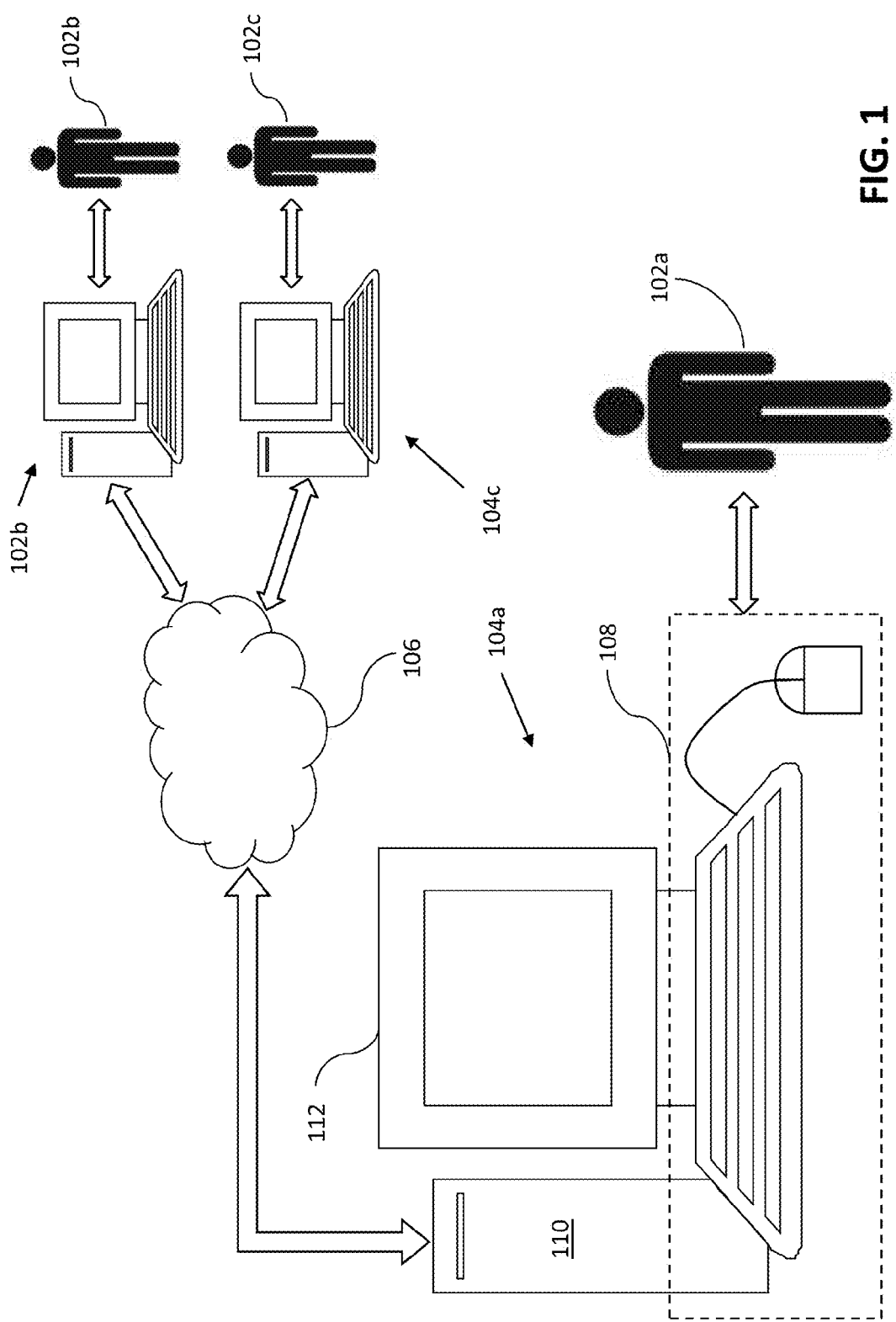
FIG. 1 is a block diagram illustrating a computer environment in which various embodiments of the invention can be practiced.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of method steps and system components related to computer-implemented method for generating a schematic illustration of a design made by inserting a plurality of devices in generally polygonal openings of a chain-link fence. Accordingly, the system components and the method steps have been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Referring now to FIG. 1, a schematic block diagram illustrating a computer environment, in which various embodiments of the invention can be practiced, is shown. A number of users, such as users 102a, 102b and 102c (hereinafter collectively referred to as the user 102) can communicate with each other using computer systems, such as computer systems 104a, 104b and 104c (hereinafter collectively referred to as the computer system 104) respectively, connected to each other over a communication network 106. Examples of communication network 106 include various wired and wireless networks, such as the internet, local area networks (LAN), metropolitan area networks (MAN), mobile networks and the like. In the exemplary embodiment of this specification, the communication network 106 is the internet.

In an embodiment of the present invention, the user 102, by using the computer system 104, generates a schematic illustration of a design made by inserting a plurality of devices (cup shaped devices disclosed in U.S. Pat. No. 7,076,898, entire contents of which are incorporated herein by reference) in generally polygonal (preferably diamond shaped) openings of a chain-link fence, for generating a decorative fence design. Other users (or customers) 102 may place an order over the communication network 106 by inputting an image or a text to be converted into a decorative fence design, by using a web-based interface of the present invention.

The computer system 104 includes a user interactive terminal 108, a processing unit 110 and a display unit 112. The user interactive terminal 108 allows the user to interact with a graphical user interface (GUI) of the present invention, displayed at the display unit 112. The user 102 can process the text or image inputted by the customers by using the GUI to generate the schematic illustration.

Figure 2:
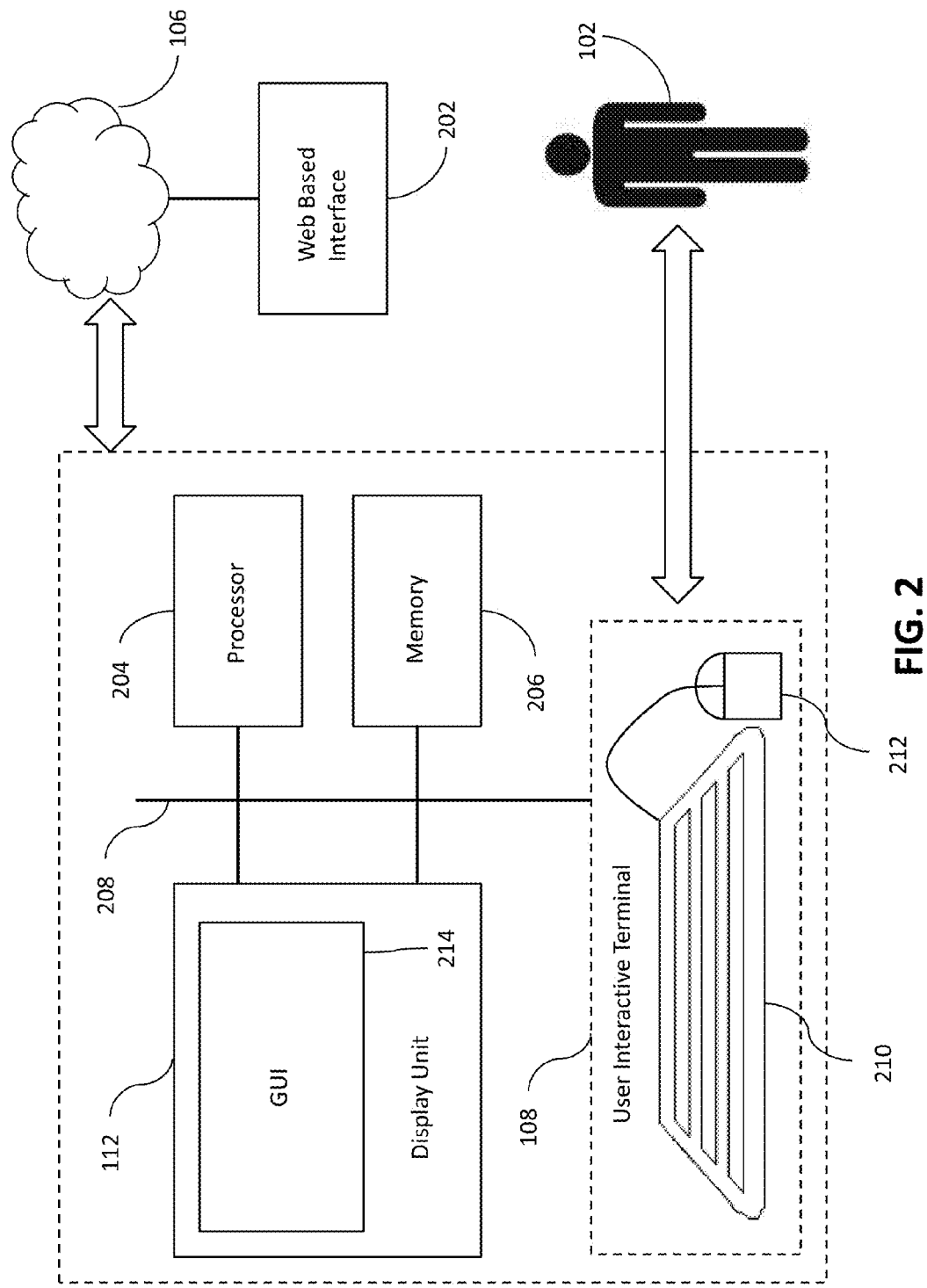
FIG. 2 is a block diagram illustrating a system for generating a schematic illustration of a design made by inserting a plurality of devices in generally polygonal openings of a chain-link fence, in accordance with various embodiments of the present invention.

FIG. 2 is a block diagram illustrating a system for generating a schematic illustration of a design made by inserting a plurality of devices in generally polygonal openings of a chain-link fence, in accordance with various embodiments of the present invention. The system 200 includes the computer system 104 and a web based interface 202 that communicate over the internet 106. The web based interface 202 may be displayed on a browser of a computer system of a customer (hereinafter referred to as the customer terminal). The computer system 104 includes the user interactive terminal 110, the display unit 112, a processor 204 and a memory 206. The user interactive terminal 110, the display unit 112, the processor 204 and the memory 206 can interact with each other through suitable interfaces connected to a bus 208.

The user interactive terminal may include various input devices, such as a keyboard 210 and a mouse 212, by using which the user can provide input to and control the GUI 214 of the present invention. The computer implemented method for generating the schematic illustration of the design and various functions associated with the GUI 214 are explained in detail in conjunction with FIGS. 3 to 9.

Figure 3:
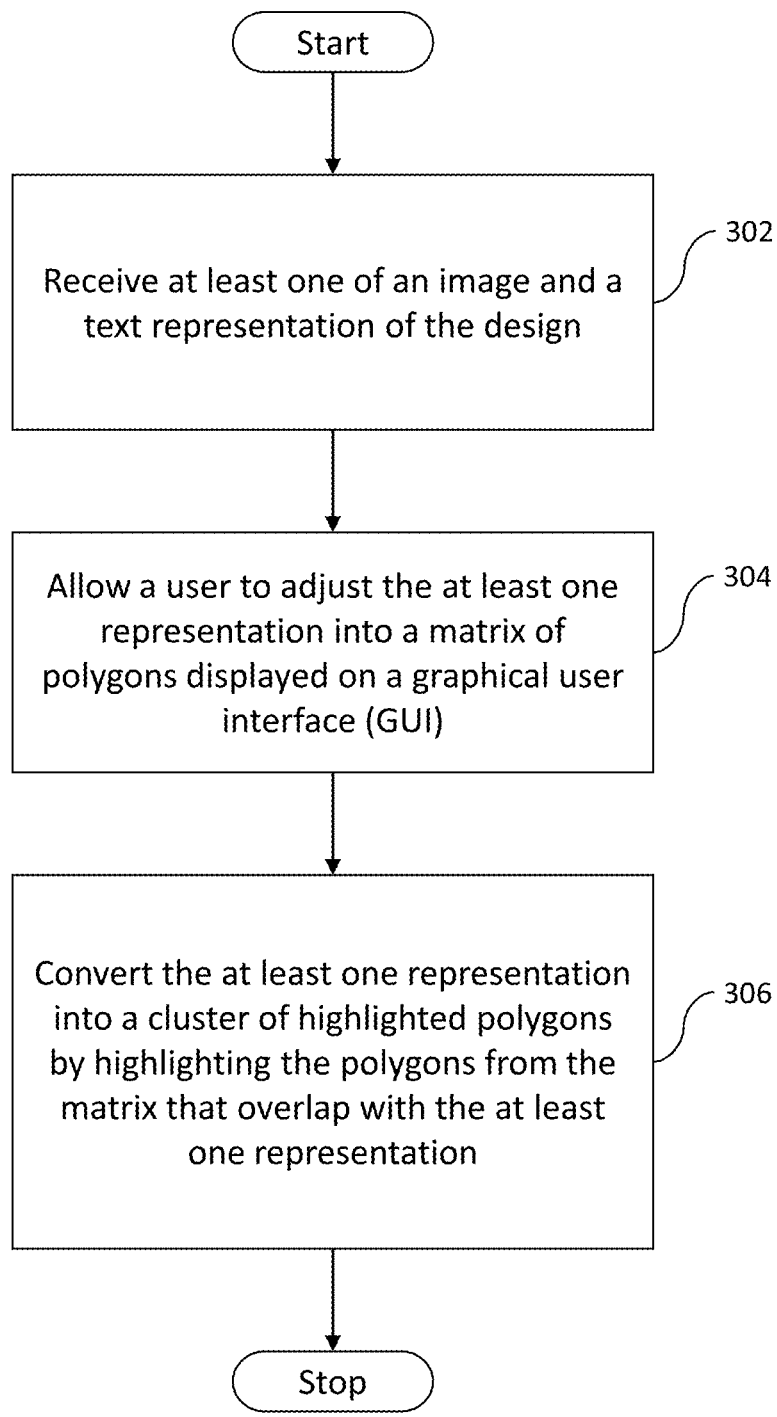
FIG. 3 is a flowchart illustrating a method for generating a schematic illustration of a design made by inserting a plurality of devices in generally polygonal openings of a chain-link fence, in accordance with an embodiment of the present invention.

FIG. 3 is a flow chart illustrating a method for generating a schematic illustration of a design made by inserting a plurality of devices in generally polygonal openings of a chain-link fence, in accordance with an embodiment of the present invention. A customer may place an order for converting a text or an image representation into a chain-link fence décor, by using the web based interface 202 explained in conjunction with FIG. 2, by inputting a text or an image representation (or a combination of text and image) of a design to be converted into chain-link fence décor. This text or image representation is received at the computer system 200, at step 302. The user 102 is allowed to adjust the text or image representation into a matrix of polygons displayed in the GUI 214. Here, the matrix of polygons represents the generally polygonal openings of the chain link fence for which the décor is to be created.

In an embodiment of the present invention, the openings of the chain-link face are diamond shaped. In various other embodiments of the present invention, the openings of the chain-link fence are triangular, square, hexagonal, octagonal, and so forth. It should be noted that the present invention is explained by taking diamond shaped openings as an example. However, the present invention is equally applicable for any other form of polygons.

At step 306, the image or text representation is converted into a cluster of highlighted polygons by highlighting polygons from the matrix that overlap with the image or text representation of the design. In an embodiment of the present invention, the polygons that completely overlap with the polygons in the matrix are highlighted. In another embodiment, the polygons that partially overlap with the polygons in the matrix are only highlighted. In a preferred embodiment, the polygons that overlap with at least 50% area of the polygons in the matrix are highlighted.

The highlighted polygons form the schematic representation of the chain-link fence décor. When polygonal cups of appropriate colors are inserted into corresponding openings of the fence, desired chain-link fence design is obtained, as explained in the U.S. Pat. No. 7,076,898.

Various embodiments of the present invention support a variety of image file formats, such as a JPEG, Portable Network Graphics (PNG), Tagged Image File Format (TIFF), Graphics Interchange Format (GIF), and a Bitmap format (BMP). It should be noted that these formats are mentioned here for illustrative purpose only, and they do not restrict the scope of the invention in any way. Numerous other image formats can be supported within the scope and spirit of the present invention.

While adjusting the image or text representation, the user 102 can select the dimensions of the matrix based on the actual dimensions of the chain-link fence. The GUI 214 allows the user to input the dimensions of the chain link fence in feet and maintains the aspect ratio on the representation matrix. For example, for a fence of the dimensions 6 feet wide by 10 feet in length, a corresponding matrix of the same aspect ratio of 3:5 may be displayed suitably. Further, depending on the dimensions of the cups to be inserted in the openings, same number of polygons (in this case, diamonds) can be provided on the matrix. In other words, the matrix displayed on the GUI 214 simulates the actual chain-link fence in terms of dimensions, geometry of openings and size of openings. Moreover, the dimensions of the polygon can be specified by the user, and accordingly, the GUI displays a suitable matrix. For example, for a diamond shaped cup of dimensions 3×3 inches, appropriate polygonal matrix is displayed when the user specifies these dimensions.

The user 102 can re-size the matrix to fit in the GUI 212. Further, the user 102 can adjust the ratio of the dimensions of the image or text representation with respect to the size of the matrix through the GUI 214. For example, in the embodiment explained herein, if the image aspect ratio is 2:5, the user can stretch the image representation to an aspect ratio of 3:5. Moreover, the user 102 can invert the text or image representation along a horizontal axis and a vertical axis.

To facilitate the user to view the extent of overlap between the text or image and the matrix, it is possible to adjust the opacity of the text or image representation, such that the matrix grid becomes visible through the text or image layer. The user can also adjust the colors of the highlighted polygons, customize outline of the schematic illustration and trim edges of the schematic illustration by using the GUI, details of which are explained further in detail in conjunction with FIG. 4.

Once the schematic representation is ready, a count of the number of highlighted polygons is generated. The count corresponds to a number of devices (in this case, cups) required for the design. Further, a cost associated with the design is calculated, based on the generated count. The calculated cost is displayed to the customer at the web based interface 202 on the customer terminal.

Figure 4:
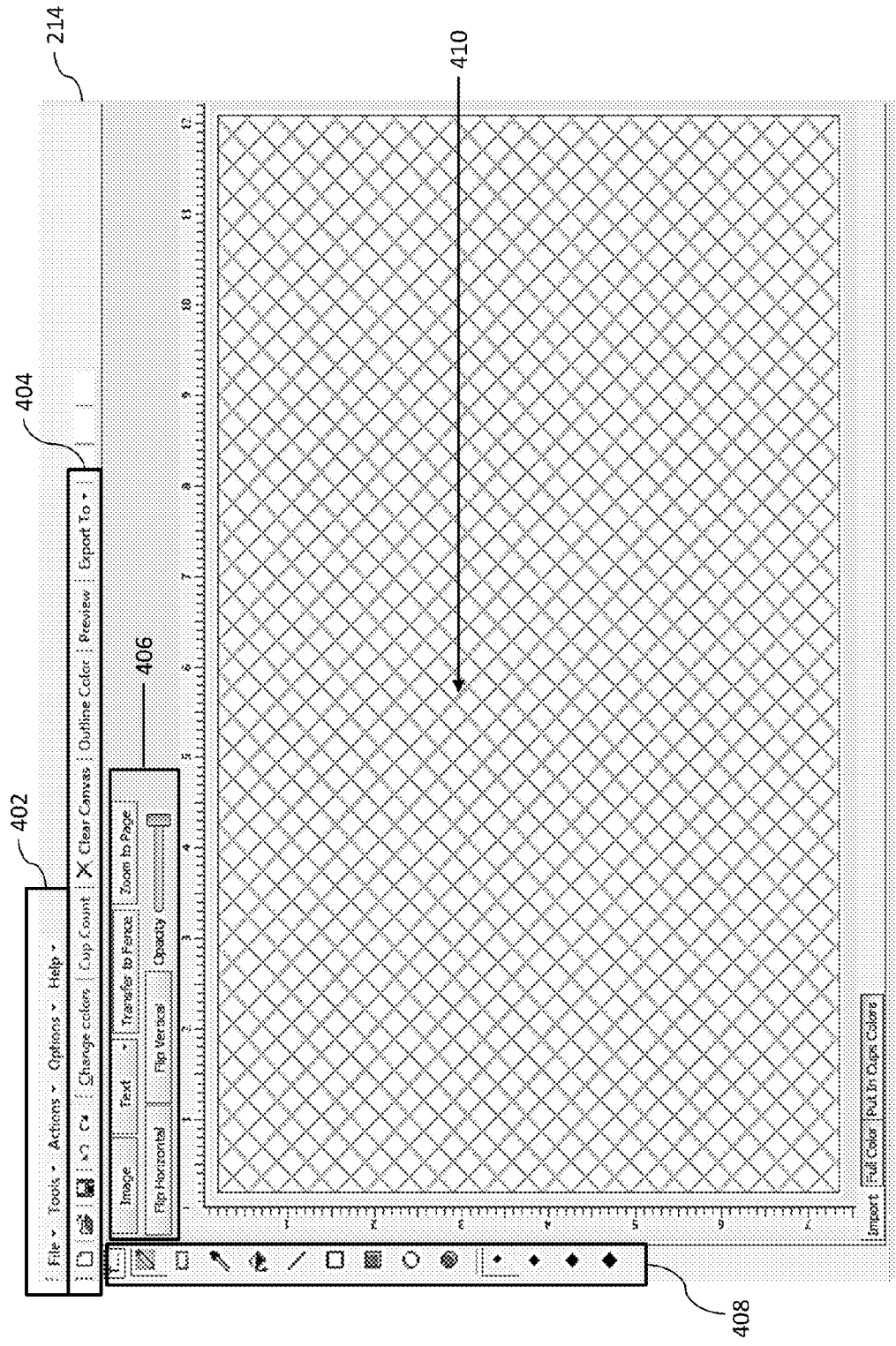
FIG. 4 shows a graphical user interface in accordance with various embodiments of the present invention.

FIG. 4 shows the graphical user interface in accordance with various embodiments of the present invention. GUI 214 includes an address bar 402, an image attribute panel 404, an image control panel 406 an image edit panel 408 and a grid area 410. The address bar 402 includes various dropdown menus such as File, Tools, Actions, Options and Help. The options in the File, Tools and Actions menus correspond to one or more functions available on the image attribute panel 404, the image control panel 406 and the image edit panel 408. The panels are provided separately for ease in navigation and selection. The Options menu includes one or more options (settings) using which the system of the present invention can be configured. These options include settings related to the color of the grid in the grid area 410, various colors of the cups available, corresponding prices and so forth. The Help menu lists the documentation pertaining to various functions of the GUI 214.

In an embodiment of the present invention, the image attribute panel 404 includes various buttons (or tabs) such as open new project, open an existing file, save project, undo, and redo, change colors, cup count, clear canvas, outline color, preview and export to buttons. The image control panel 406 includes various buttons (or tabs) such as image, text, transfer to fence, zoom to page, flip horizontal, flip vertical, and opacity control buttons. The image edit panel 408 includes various buttons (or tabs) such as paint/draw free form, select areas, color picker, color fill, line, hollow rectangle, filled rectangle, hollow ellipse, filled ellipse, and fill cups buttons.

The grid area 410 is a matrix of polygons that represents the chain-link fence. The user 102 can specify the dimensions of the grid area 410. Further, the shape of the polygons on the grid area 410 can be chosen, such that it is same as that of the chain-link fence. Finally, the dimensions of the polygons on the grid area 410 represent the dimensions of the polygonal openings of the chain-link fence.

Figure 5:
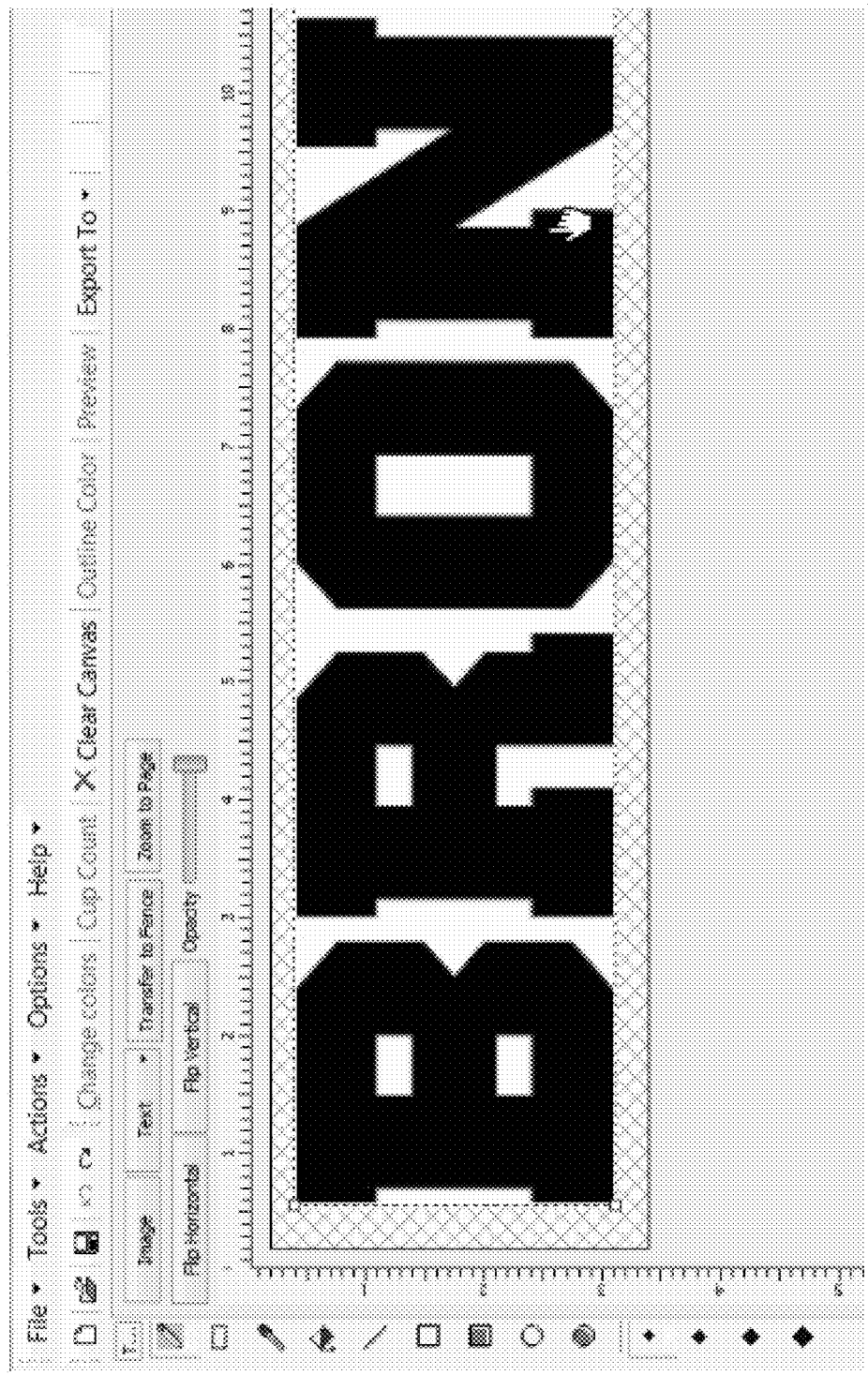
FIG. 5 shows an image representation of a décor design, inputted on the graphical user interface, in accordance with an embodiment of the present invention.
Figure 6:
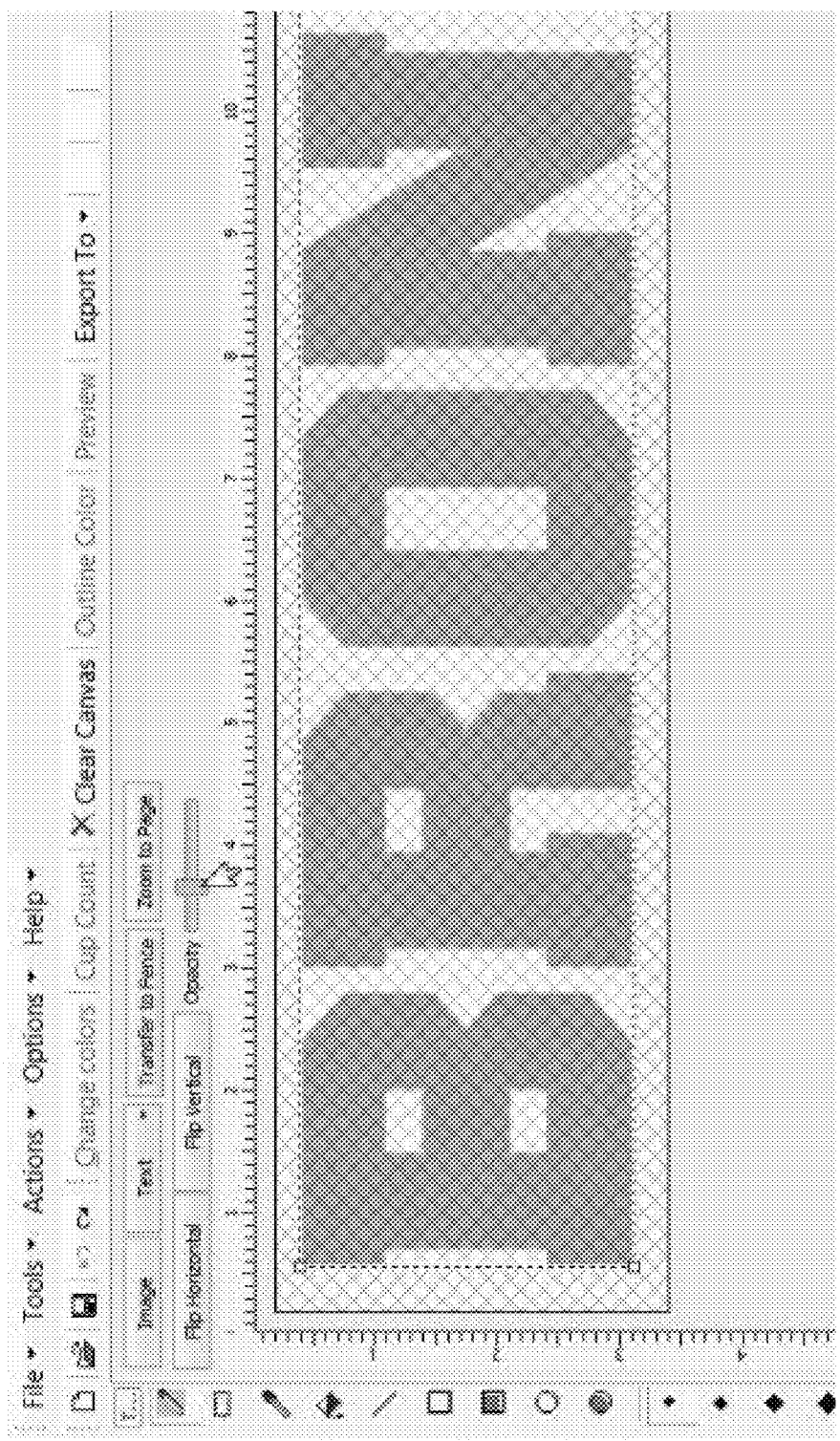
FIG. 6 illustrates an opacity control function, in accordance with an embodiment of the present invention.

The image control panel 406 may appear when a new project is initiated in the GUI 214. When an image or text representation is opened on the GUI 214, it is displayed on the grid area 410, as shown in FIG. 5. As discussed in the foregoing description, the user can resize the image or text appropriately by selecting the image area by using the mouse 212. The opacity of the image can be reduced such that the matrix on the grid area 410 becomes visible, as shown in FIG. 6. This option lets the user control the placement of the image or text representation with respect to the chain-link fence. The user can also align the edges of the image or text with the edges of the polygons on the grid. The image or text representation of the design can then be transferred to the fence by using 'transfer to fence' button.

Figure 7:
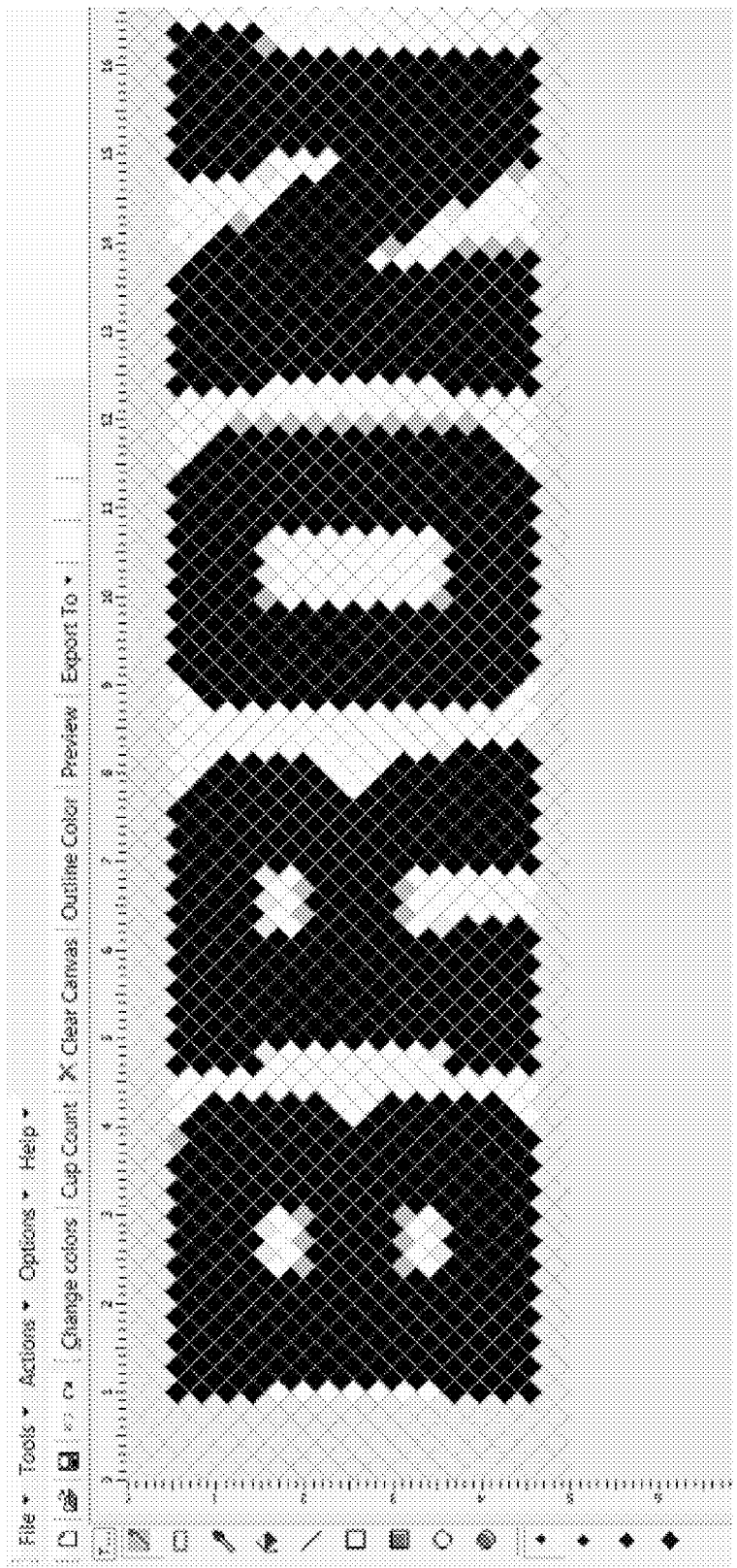
FIG. 7 illustrates an transfer to fence function, in accordance with an embodiment of the present invention.

As explained in detail in conjunction with FIG. 3, the transfer to fence function detects the overlapping polygons of the image or text representation and highlights them. This will be apparent from the output as illustrated in FIG. 7. Once the image or text representation is transferred to the fence, the user 102 can manipulate it to produce the desired schematic illustration for the chain-link fence décor, by using various buttons and options available on the GUI 214.

Figure 8:
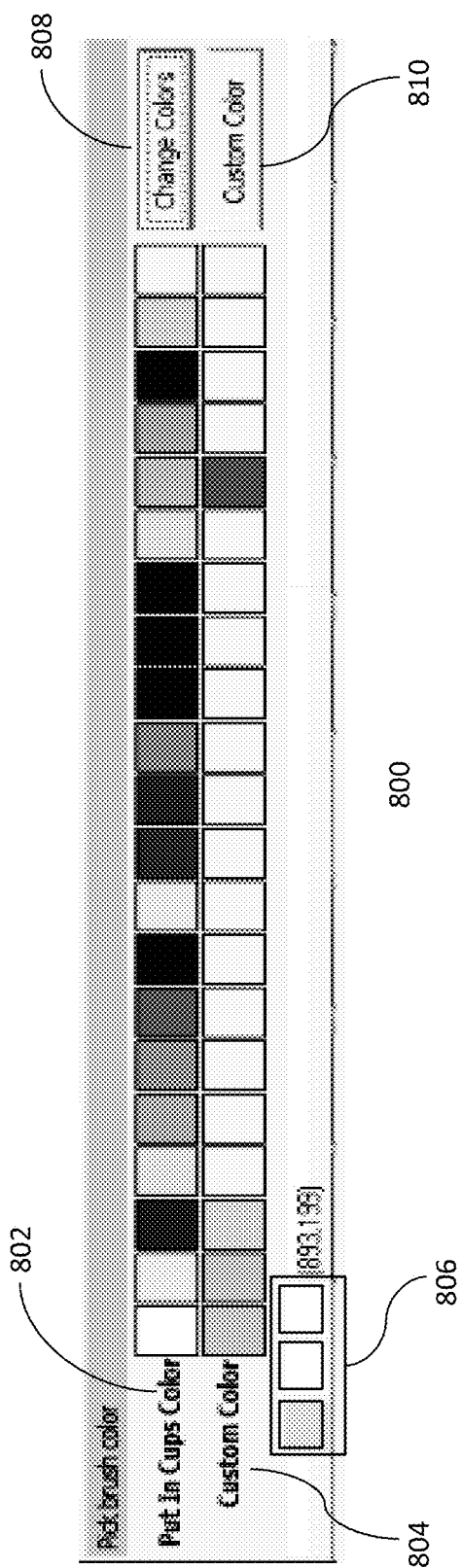
FIG. 8 shows a color palette, in accordance with an embodiment of the present invention.

For an image that contains multiple colors, a color palette as shown in FIG. 8 is provided in an embodiment of the present invention. Color palette 800 includes a Putin Cups colors row 802, a Custom color row 804, a selection pane 806, change colors button 808, a custom color button 810 and a color wheel (not shown). The Putin cups colors row 802 includes various available colors of the cups, whereas the Custom colors row 804 includes various custom colors selected by the user 102 from the color wheel. In an embodiment of the present invention, color wheel is a standard wheel representing primary, secondary and complementary colors. The user can specify the current color by selecting it from the Putin Cups colors row 802 or Custom colors row 804. This selection can be made by using the change colors button 808 and custom color button 810 respectively. In an embodiment of the present invention, the user may also specify the RGB or CMYK values of the desired color. The selection pane 806 displays the current color.

In an embodiment of the present invention, multiple colors can be supported on the selection pane 806, and the user 102 can toggle between them. In an exemplary embodiment shown in FIG. 8, three colors are accommodated in the selection pane 806.

The functionalities of some of the buttons or tabs mentioned above are well known in the art and their description has been avoided so as not to obfuscate the present invention. The table below lists the functionalities associated with the other buttons:

| Button/Tab | Description |
|---|---|
| Change colors | Replaces foreground color with background color |
| Cup count | Opens a calculate cup count dialog (FIG. 9) |
| Clear canvas | Clears the canvas (Grid area 410) |
| Outline color | Allows to select the color for the outline |
| Preview | Previews the entire canvas as a fence |
| Export to | Exports the image to various image formats such as JPG, BMP, PNG, TIFF and the like |
| Image | Input an image |
| Text | Input a text (the user may be offered an option to select the font from available fonts) |
| Transfer to fence | When the image or text is input, this button transfers it in the form of highlighted polygons, as explained in conjunction with FIGS. 3 and 4. |
| Zoom to page | Large/small fence areas can be zoomed in/out to fit on the available screen size |
| Flip horizontal | Horizontally flip the image or text |
| Flip vertical | Vertically flip the image of text |
| Opacity control | Change opacity of the image or text. Ranges between 0% and 100% |
| Paint/draw free form | Fills one pixel at a time with cursor and allows the user to draw freely |
| Select areas | Select a particular area of the grid |
| Color picker | Pick a color (FIG. 8) |
| Color fill | Fill a color |
| Line | Draw a line |
| Hollow rectangle and Filled rectangle | Draw hollow rectangles and rectangles filled with selected colors |
| Hollow ellipse and Filled ellipse | Draw hollow ellipses (circles) and ellipses (circles) filled with selected colors |
| Fill cups | A number of polygons can be selected to fill. Examples: 1 at a time, 2 at a time, 4 at a time and so forth. |

Figure 9:
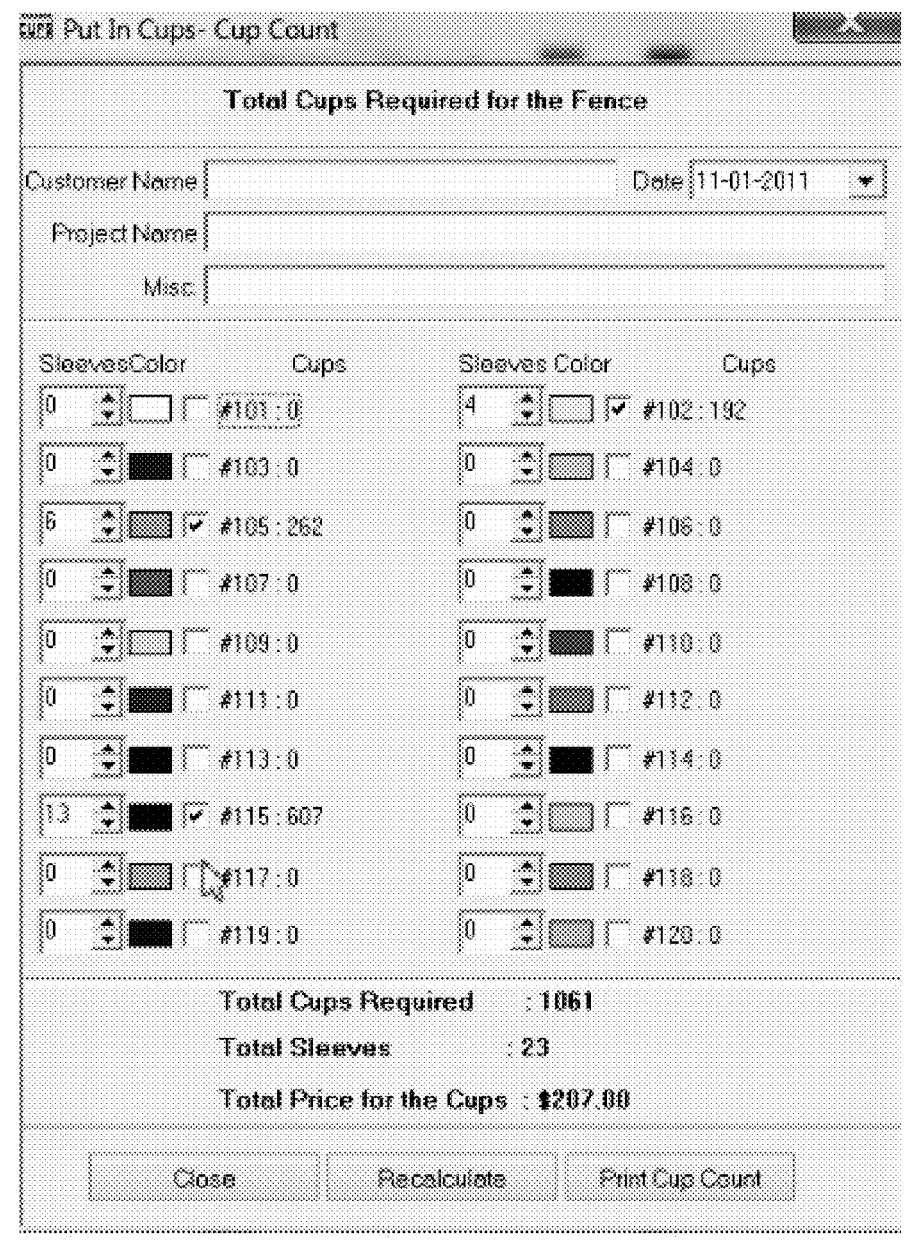

Once the schematic illustration is ready, the user 102 can generate the cup count, by using the cup count button. A pop up window, as shown in FIG. 9 is displayed, which lists the various cup colors, their quantities and the associated costs. The user can make modifications to, save and print these parameters. Further, the cost associated with the design décor can be calculated based on the cup count for individual colors and costs associated with the cups of various colors. The project can be saved for future reference by specifying the filename, customer name, project name and miscellaneous comments.

As explained in conjunction with FIG. 2, the web based interface 202 may be accessed by a customer at the customer terminal for placing an order for the design décor. The customer can enter the image or text representation or a combination at the web based interface. Further, the customer can select one or more colors associated with the design and view a cost associated with the design, print one or more parameters associated with the design such as the number of cups, colors of cups and so forth, print the cost, and place an order for the design.

Various embodiments of the present invention offer the following advantages: The method for designing fence décor eliminates the manual intervention required in the design process and estimation of number of cups. The method and system are cost effective and convenient to be used in fence décor.

In general, the various embodiments of the present invention may be implemented in hardware or special purpose circuits, software, logic, or any combination thereof. For example, some aspects may be implemented in hardware, while other aspects may be implemented in firmware or software which may be executed by a processor, such as a controller, microprocessor or other computing device, although the invention is not limited thereto. While various aspects of the invention may be illustrated and described as block diagrams or flow charts, it will be understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus, the present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

What is claimed is:

1. A method for creating a design using cups on a chain-link fence, wherein the chain-link fence includes a plurality of diamond shaped openings, the method comprising:
   accepting a first input from a user for selecting dimensions of a matrix of diamonds displayed on a graphical user interface (GUI) of the computer, wherein the matrix of diamonds represent the plurality of diamond shaped openings of the chain-link fence and dimensions of the matrix of diamonds are based on dimensions of the chain-link fence;
   accepting a second input from the user, wherein the second input includes a representation of an image and/or a text of the design;
   accepting a third input from the user adjusting the representation into the matrix of diamonds displayed on the graphical user interface (GUI) of the computer;
   adjusting an opacity of the representation to view an extent of overlap of the matrix of diamonds with the representation;

converting the representation into a cluster of highlighted diamonds by highlighting each of the plurality of diamonds from the matrix of diamonds that overlaps with representation, wherein each of the plurality of diamonds having the representation overlapping with at least 50% area of each of the plurality of diamonds in the matrix of diamonds is highlighted, and wherein the cluster of highlighted diamonds represents a schematic illustration of the design and obtaining a cup count; and inserting the cups corresponding to the cluster of highlighted diamonds and count into a corresponding plurality of diamond shaped openings of the chain-link fence, thereby creating the design on the chain-link fence.

2. The method according to claim 1, wherein the image representation comprises one of a JPEG, Portable Network Graphics (PNG), Tagged Image File Format (TIFF), Graphics Interchange Format (GIF), and a Bitmap format (BMP) image file.

3. The method according to claim 1, wherein accepting the third input from the user to adjust the representation comprises accepting a fifth input from the user to adjust the ratio of dimensions of the representation with respect to the size of the matrix through the GUI.

4. The method according to claim 1, wherein accepting the third input from the user to adjust the representation further comprises accepting a sixth input from the user to invert the representation along a horizontal axis and a vertical axis through the GUI.

5. The method according to claim 1, wherein accepting the third input from the user to adjust the representation further comprises accepting a seventh input from the user to adjust one or more colors of the highlighted polygons, customize outline of the schematic illustration and trim edges of the schematic illustration through the GUI.

6. The method according to claim 1 further comprising: generating a count of the number of highlighted polygons, wherein the count corresponds to a number of put-in-cups required for the design; and calculating a cost associated with the design, based on the generated count.

7. A computer program product for use with a computer, for creating a design using cups on a chain-link fence, wherein the chain-link fence includes a plurality of diamond shaped openings, the computer program product performing the steps of:

accepting a first input from a user for selecting dimensions of a matrix of diamonds displayed on a graphical user interface (GUI) of the computer, wherein the dimensions of the matrix of diamonds are based on dimensions of the chain-link fence;

accepting a second input from the user, wherein the second input includes a representation of an image and/or a text of the design;

accepting a third input from the user to adjust the representation into the matrix of diamonds displayed on the graphical user interface (GUI) of the computer, wherein the matrix of diamonds represents the plurality of diamond shaped openings of the chain-link fence;

accepting a fourth input from the user, wherein the fourth input specifies dimensions of diamonds in the matrix of diamonds;

adjusting an opacity of the representation to view an extent of overlap of the matrix of diamonds with the representation;

converting the representation into a cluster of highlighted diamonds by highlighting each of the plurality of diamonds from the matrix of diamonds that overlaps with the representation, wherein each of the plurality of diamonds having the representation overlapping with at least 50% area of each of the plurality of diamonds in the matrix of diamonds is highlighted, wherein the cluster of highlighted diamonds represents a schematic illustration of the design and obtaining a cup count.

8. The computer program product according to claim 7, wherein the image representation comprises one of a JPEG, Portable Network Graphics (PNG), Tagged Image File Format (TIFF), Graphics Interchange Format (GIF), and a Bitmap format (BMP) image file.

9. The computer program product according to claim 7, wherein accepting the third input from the user to form and adjust the representation comprises accepting a fifth input from the user to adjust the ratio of dimensions of the representation with respect to the size of the matrix through the GUI.

10. The computer program product according to claim 7, wherein accepting the third input from the user to form and adjust the representation further comprises accepting a sixth input from the user to invert the representation along a horizontal axis and a vertical axis through the GUI.

11. The computer program product according to claim 7, wherein accepting the third input from the user to form and adjust the representation further comprises accepting a seventh input from the user to adjust one or more colors of the highlighted polygons, customize outline of the schematic illustration and trim edges of the schematic illustration through the GUI.

12. The computer program product according to claim 7 further performing: generating a count of the number of highlighted polygons, wherein the count corresponds to a number of put-in-cups required for the design; and calculating a cost associated with the design, based on the generated count.

13. A system for generating a schematic illustration of a design made by inserting a plurality of cups in a plurality of diamond shaped openings of a chain-link fence, wherein a representation of an image and/or a text of the design is received at the system, the system comprising:

a memory;

a display unit for displaying a graphical user interface (GUI) stored at the memory;

a user interactive terminal configured for:
    accepting a first input from a user for selecting dimensions of a matrix of diamonds displayed on a graphical user interface (GUI) of the computer, wherein the matrix of diamonds represent the plurality of diamond shaped openings of the chain-link fence and dimensions of the matrix of diamonds are based on dimensions of the chain-link fence;
    accepting a second input from a user to adjust the representation into a matrix of diamonds displayed on the graphical user interface (GUI); and
    adjusting an opacity of the representation to view an extent of overlap of the matrix of diamonds with the representation;

a processor, communicatively coupled to the display unit, the memory, and the user interactive terminal, wherein the processor is configured for converting and displaying the representation into a cluster of highlighted diamonds by highlighting each of a plurality of diamonds from the matrix of diamonds that overlaps with the representation, wherein each of the plurality of diamonds having the representation overlapping with at least 50% area of each of the plurality of diamonds in the matrix of diamonds is highlighted, wherein the cluster of highlighted diamonds represents the schematic illustration of the design and obtaining a cup count.

14. The system according to claim 13 further comprising a storage device for storing at least one of the image representation of the design, the text representation of the design, and the schematic illustration of the design.

\* \* \* \* \*